United States Patent
Saaroni et al.

(10) Patent No.: US 8,739,130 B2
(45) Date of Patent: May 27, 2014

(54) QUALITY ASSURANCE TESTING

(75) Inventors: Dror Saaroni, Yahud (IL); Mordechai Lanzkron, Yehud (IL); Yury Kovalev, Odessa (UA)

(73) Assignee: Hewlett-Packard Development Company, L.P., Houston, TX (US)

( * ) Notice: Subject to any disclaimer, the term of this patent is extended or adjusted under 35 U.S.C. 154(b) by 825 days.

(21) Appl. No.: 12/608,096

(22) Filed: Oct. 29, 2009

(65) Prior Publication Data
US 2011/0107304 A1 May 5, 2011

(51) Int. Cl.
*G06F 9/44* (2006.01)

(52) U.S. Cl.
USPC .......................................... 717/125; 717/133

(58) Field of Classification Search
None
See application file for complete search history.

(56) References Cited

U.S. PATENT DOCUMENTS

| | | | |
|---|---|---|---|
| 5,513,315 A | 4/1996 | Tierney et al. | |
| 5,671,351 A * | 9/1997 | Wild et al. | 714/38.13 |
| 6,058,493 A | 5/2000 | Talley | |
| 6,345,322 B1 | 2/2002 | Humphrey | |
| 6,427,000 B1 * | 7/2002 | Mumford et al. | 379/9 |
| 7,016,957 B2 * | 3/2006 | Morimoto et al. | 709/224 |
| 7,228,524 B2 | 6/2007 | Bailey et al. | |
| 7,313,564 B2 * | 12/2007 | Melamed et al. | 717/124 |
| 7,316,009 B2 | 1/2008 | Peck | |
| 7,490,319 B2 | 2/2009 | Blackwell et al. | |
| 7,496,627 B2 * | 2/2009 | Moorer et al. | 709/204 |
| 2002/0116153 A1 * | 8/2002 | Wybouw-Cognard | 702/186 |
| 2004/0107415 A1 | 6/2004 | Melamed et al. | |
| 2004/0123272 A1 | 6/2004 | Bailey et al. | |
| 2008/0163003 A1 | 7/2008 | Mehrotra | |
| 2009/0204795 A1 * | 8/2009 | Nasuto et al. | 712/227 |

* cited by examiner

*Primary Examiner* — Elias Mamo

(57) ABSTRACT

A quality assurance system has a test generator for applying tests to an application program and a correlator for logging events that occur during testing in correlation with test steps so as to generate a test log. The quality assurance program has a user interface for providing an interactive presentation displaying a list of events and a list of test steps such that: 1) selecting a test step will cause a correlated event to be highlighted, and 2) selecting an event will cause a correlated test step to be highlighted.

16 Claims, 2 Drawing Sheets

QUALITY ASSURANCE TESTING

BACKGROUND

Herein, related art is described for expository purposes. Related art labeled "prior art", if any, is admitted prior art; related art not labeled "prior art" is not admitted prior art.

Quality assurance (QA) regimes for application software typically: 1) verify that software works in a variety of settings and, 2) when the software works, validate that the software functions as intended. However, QA programs cannot catch all errors that might impact a user's experience. When an application fails "in the field", it is often too late to collect information about what was happening just before the failure that might be helpful in diagnosing the fault. Accordingly, application software developers sometimes include provisions for detecting and logging "diagnostic events" that are not faults in themselves, but may be helpful in diagnosing a fault that does occur. When a fault occurs, a diagnostic-event log can be collected and reviewed to help determine the cause of the fault.

DETAILED DESCRIPTION

Figure 1:
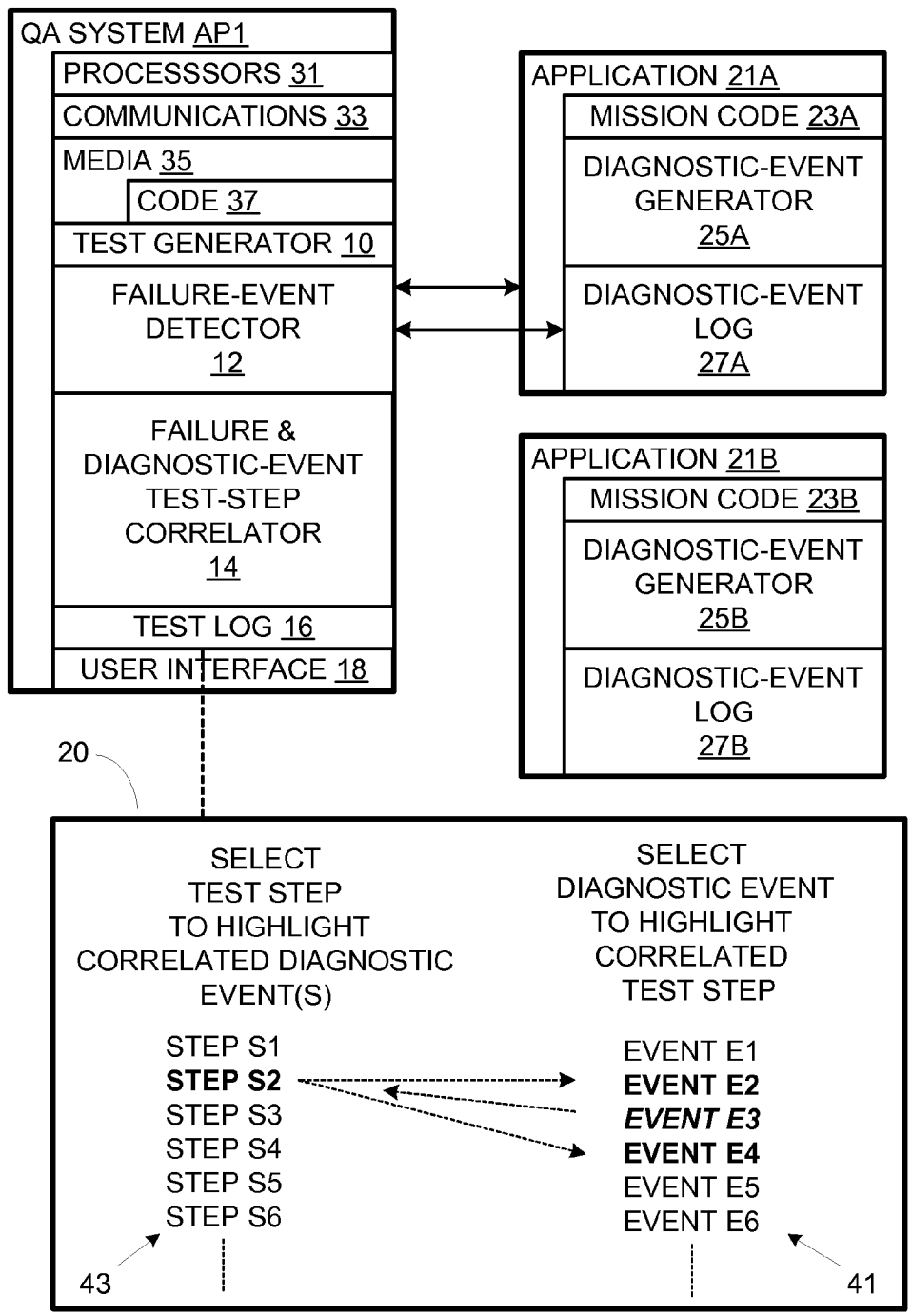
FIG. 1 is a schematic diagram of a quality-assurance system and applications to be tested by the system.

Correlating QA test steps with non-fault diagnostic events can increase the rigor of a QA program and provide application developers valuable data for reducing the potential for application program faults. Accordingly, as shown in FIG. 1, a QA system AP1 includes a test generator 10, a failure-event detector 12, and a failure-and-diagnostic-event to test-step correlator 14 that provides a test log 16. QA system AP1 also provides a user interface 18 that helps a developer to visualize correlations between test steps and events, e.g., by generating an interactive presentation 20.

QA system AP1 tests different applications, for example, a word-processing application 21A and an accounting application 21B, as well as different versions of the same application. Each application can include mission code, e.g., a word-processing application 21A can include mission code 23A for implementing word-processing functions, while accounting application 23B can include mission code for implementing accounting functions. In general, different applications will include different mission code, although in some cases, two versions of an application could differ in a way that does not involve the mission code itself. For example, two versions of the same application could have different diagnostic event generators. QA system AP1 can include computer hardware and software including processors 31 for executing code 37 including the QA tests and the application under test, communications devices 33, and computer-readable storage media 35 for storing code 37, including program instructions and data.

Although it includes built-in logic tests so that it can test applications without diagnostic-event generators, QA system AP1 provides additional functionality when testing those that include diagnostic-event generators. Different applications can include different diagnostic event generators or include different instances of identical diagnostic event generators. For example, application 21A includes a diagnostic-event generator 25A, while application 21B includes a different diagnostic-event generator 25B.

Diagnostic-event generators 25A and 25B can differ in that the events that they detect and log into respective logs 27A and 27B are not all the same. For example, diagnostic-event generator 25B for accounting application 21B may detect that an accounting error was generated and automatically corrected, while diagnostic-event generator 25A may be incapable of detecting such an event. However, different diagnostic-event generators can also provide for detecting some of the same event types, e.g., detecting that a communication had to be retried before it was successful.

Interactive presentation 20 presents an event list 41 and a step list 43. Event list 41 lists a series of events E1-E6 and so on recorded to test log 16 by correlator 14; step list 43 lists a series of test steps S1-S6 and so on. The two lists are not, in general, related on a one-to-one basis. For example, event E3 may have occurred during step S2 rather than step S3.

Hovering over the label "Event E3" in presentation 20 highlights it, as indicated in italics; clicking on "Event E3" further highlights it, as indicated in bold and also highlights a step-list label "Step S2", as indicated in bold, to indicate the step correlated with event E3 in test log 16. Likewise, hovering over label "Step S2" would highlight it and clicking on it would further highlight that label and the labels for any events correlated with Step S2 in test log 16. In the illustrated case, events E2-E4 are correlated with step S2. In the illustrated case, selecting (e.g., "clicking on") "Event E3" highlights it, the label Step S2, and the labels for Events E2-E4, with label "Event E3" doubly highlighted as indicated in bold and italics. Thus, selecting an event can indicate the step it occurred during as well as the other events that occurred during that step.

The events detected by failure-event detector 12 are typically errors that indicate that the product is not functioning properly. Such errors may include, for example, verification errors such as failures to respond and other program faults; in addition, validation errors such as calculation errors can be detected by failure-event detector. Program faults can also be detected by diagnostic event generators 25A and 25B and recorded in logs 27A and 27B. Some validation errors detected by failure-event detector 12 may be missed by a diagnostic event generator. On the other hand, a diagnostic event generator may detect a validation error that has been corrected and is therefore not detected by failure-event detector 12. The diagnostic event generators may detect communication failures that succeed upon retry and other corrected errors that would be missed by failure-event detector 12.

In the event a failure event is detected by detector 12, the quality assurance test may be considered "failed". Typically this means the application will be returned to development rather than released. In this case, the diagnostic event data in log 16 are likely to be helpful in diagnosing and correcting the cause of the failure.

Even where no failure is detected by failure event detector 12, the diagnostic event data may indicate a problem that should be fixed rather than endured by end users. For example, if a large number of data errors need correction or a large number of retries are required under certain test conditions, it may be better to address the situation than release the software. Accordingly, thresholds for diagnostic events can be set so that the diagnostic event data is used to establish a more rigorous standard for QA testing.

Figure 2:
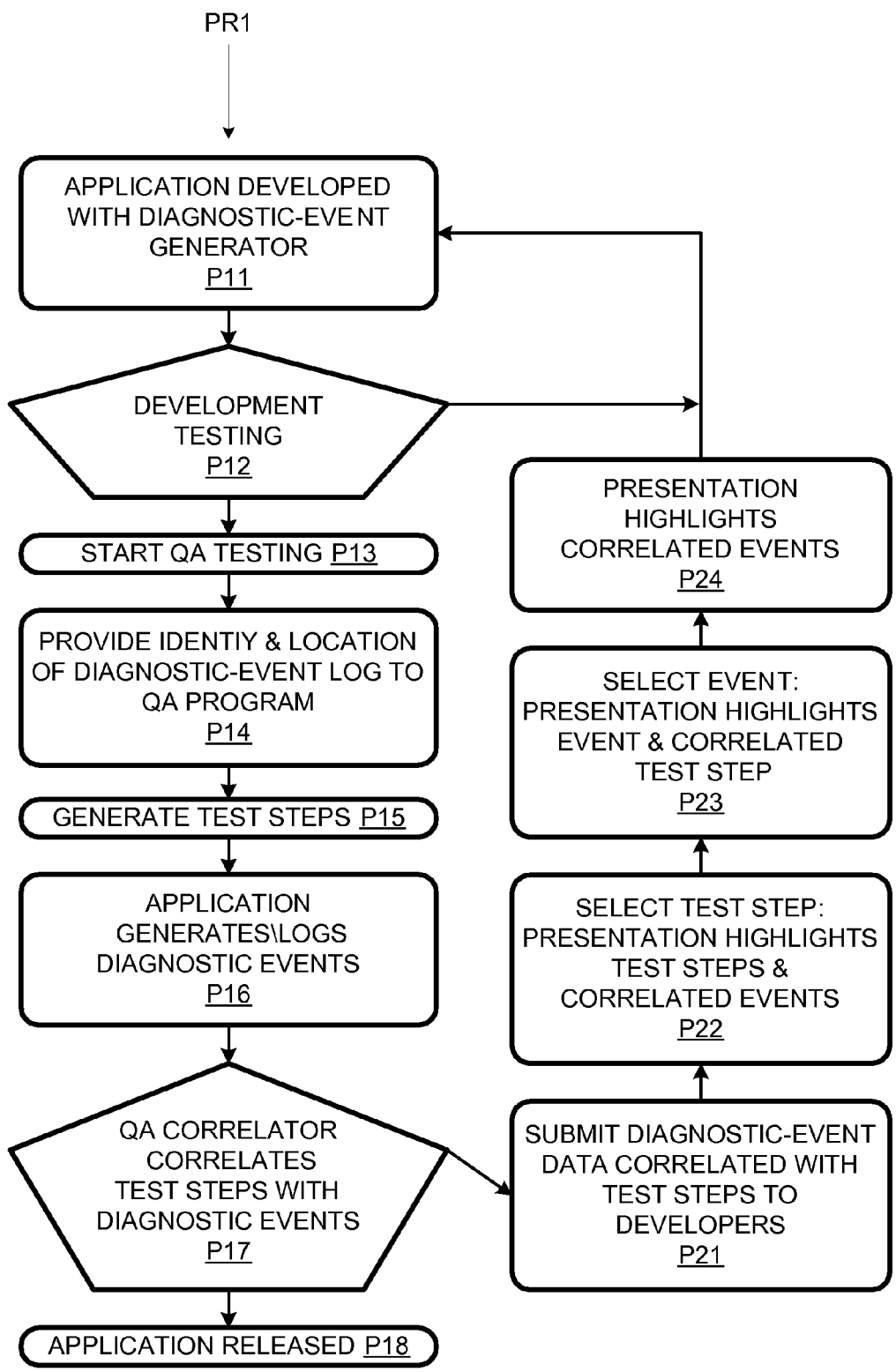
FIG. 2 is a flow chart of a software application process, part of which is implemented using the system of FIG. 1.

System AP1 is used in a process PR1, flow-charted in FIG. 2. At process segment P11, an application including a diagnostic-event generator is developed. The diagnostic events that are to be generated and logged can vary by the nature of the application. At process segment P12, the application is subject to development testing. This can include debugging, logic validation, and testing of particular features. If the application fails development testing, it is returned for further development. Otherwise, it is transferred for QA testing.

At process segment P13, QA testing begins. At process segment P14, QA system AP1 is informed of the identity and location for a diagnostic event log. If the log exists, e.g., as an empty log, at the beginning of testing, the location is the location of the empty log. If the log does not exist until the first entry is submitted, the location is the location that the log file will have when it is created. Also, QA System AP1 can set a location for a diagnostic event log(and get or set any other attributes as well, e.g., threshold of logging). In addition, QA system AP1 can be subscribed for events so that the log lines are sent directly and not read from a log file. At process segment P15, test steps are generated. At process segment P16, in response to the test steps of process segment P15, the application under test may and typically does generate and log diagnostic events.

At process segment P17, and concurrent with process segments P15 and P16, QA correlator 14 correlates test steps with diagnostic events. This involves accessing diagnostic event records, either through subscription or by accessing the diagnostic event log having the identity and location defined at process segment P14. This can be done at the end of testing or multiple times during testing so that the events can be correlated to the test steps that may have caused the diagnostic events to be generated. If the application passes QA system AP1, it can be released and made available to end users at process segment P18.

An application can fail a QA test when a failure event is detected by failure-event detector 12, or it can fail because of an unacceptable pattern of diagnostic events detected by the diagnostic-event generator (e.g., generator 25A) for an application program (e.g., application 21A). In either case, if an application fails at process segment P17, the correlated test step and diagnostic event (and other events) data can be provided to developers at process segment P21.

At process segment P22, a developer interacting with presentation 20 can select a test step. In response, presentation 20 highlights the selected test step and the correlated event or events. At process segment P23, a developer interacting with presentation 20 can select a diagnostic or other event. In response, presentation 20 highlights the selected event and the correlated test step. In further response, at process segment 24, the presentation can highlight other correlating events associated with the correlated test step. With this correlated test-step and event data, application development can continue, returning to process segment P11.

"System" refers to any set of interacting elements. The elements can be hardware components, mechanical components, software components including individual instructions encoded in storage media, atoms, process and method steps and segments, etc. Herein, in the context of an interactive presentation, references to selecting and highlighting test steps and events imply that representations of those steps and acts are selected and highlighted. In various embodiments, applications under test can run on the same or on a different computer from the QA software; also, test steps can be automated or initiated manually.

Testing can involve running the application in a variety of environments with different operating systems, different browsers, different hardware platforms and configurations, different software configurations, etc. Testing can involve simulating user interactions with hardware and software, as well as other phenomena such as a sudden power outage. The granularity of the test steps can vary, with finer steps generally providing more detailed information. The described and other variations upon and modifications to the illustrated embodiment are addressed by the following claims.

What is claimed is:

1. A quality assurance system comprising computer hardware programmed with code to:
   apply tests to an application under test that logs diagnostic events occurring during test steps of said tests;
   determine which diagnostic events occurred during which test steps; and
   present an interactive presentation displaying a list of diagnostic events and a list of test steps such that
      selecting a test step from the list of test steps causes
         the selected test step to be highlighted relative to other test steps in the list of test steps, and
         events that occurred during the selected test step to be highlighted relative to other events in the list of diagnostic events that did not occur during the selected test step, and
      selecting a diagnostic event from said list of diagnostic events causes a test step during which the diagnostic event occurred to be highlighted relative to test steps, in the list of test steps, during which the selected diagnostic event did not occur.

2. A quality assurance system as recited in claim 1 wherein, the selecting the diagnostic event automatically causes other diagnostic events that occurred during the highlighted test step to be highlighted relative to other diagnostic events in the diagnostic event list that did not occur during the highlighted test step.

3. A quality assurance system as recited in claim 1 wherein said diagnostic events include non-failure events the occurrence of which does not result in a failure of a test.

4. A quality assurance system as recited in claim 1 wherein at least one diagnostic event relates to an event associated with a retry or an error generated and then corrected by said application under test.

5. A quality assurance process comprising:
   a user interacting with an interactive presentation including a list of test steps and a list of diagnostic events so as to select from the list of test steps a first test step of a quality assurance test of an application under test; and
   said interactive presentation responding by highlighting diagnostic events that occurred during the selected test step, said highlighting being relative to diagnostic events, in said list of diagnostic events, logged by said application under test that did not occur during the selected test step.

6. A quality assurance process as recited in claim 5 further comprising:
   a user interacting with said presentation so as to select, from said list of diagnostic events, a first diagnostic event generated by said application under test during a second test step; and
   in response, said presentation highlighting said second test step relative to other steps in the list of test steps during which the first diagnostic event did not occur.

7. A quality assurance process as recited in claim 6 further comprising, in response to said presentation highlighting said second test step, highlighting at least a second diagnostic event that occurred during the second test step.

8. A quality assurance process as recited in claim 5 wherein said presentation includes a list of events that includes:
   events detected and logged by a quality assurance program and not by said application under test; and
   events logged by said application under test.

9. A quality assurance process as recited in claim 8 wherein said events logged by said application under test include non-failure diagnostic events.

10. A system comprising non-transitory computer-readable storage media encoded with code to, when executed by a processor:
- apply quality assurance test steps to an application under test so that said application under test generates and logs diagnostic events; and
- determine which diagnostic events occurred during which steps,
- wherein said code further defines an interactive presentation for displaying a list of events including said diagnostic events and a list of said test steps so that when a user selects one of said test steps, one or more correlated diagnostic events are highlighted,
- wherein said interactive presentation also provides for highlighting a first test step when a first correlated diagnostic event is selected,
- wherein, in response to said highlighting a test step, said interactive presentation provides for automatically highlighting other diagnostic events correlated with said first test step.

11. A system as recited in claim 10 wherein the determining includes reading an event log in which the diagnostic events have been recorded by said application under test.

12. A system as recited in claim 10 further comprising one or more processors for executing said code.

13. A system as recited in claim 10 wherein the correlating involves a quality assurance system reading an event log generated by said application under test.

14. A system as recited in claim 10 wherein said code further defines an interactive presentation for displaying a list of events including said diagnostic events and a list of said test steps so that when a user selects one of said test steps from the lists of test steps, one or more correlated diagnostic events are highlighted.

15. A system as recited in claim 10 wherein said interactive presentation also provides for highlighting a first test step when a first correlated diagnostic event is selected.

16. A system as recited in claim 10 wherein, in response to said highlighting a test step, said code provides for automatically highlighting other diagnostic events correlated with said first test step.

* * * * *

UNITED STATES PATENT AND TRADEMARK OFFICE
CERTIFICATE OF CORRECTION

| | | |
|---|---|---|
| PATENT NO. | : 8,739,130 B2 | Page 1 of 1 |
| APPLICATION NO. | : 12/608096 | |
| DATED | : May 27, 2014 | |
| INVENTOR(S) | : Dror Saaroni et al. | |

It is certified that error appears in the above-identified patent and that said Letters Patent is hereby corrected as shown below:

IN THE CLAIMS

In column 5, line 11, in Claim 10, before "steps," insert -- test --.

Signed and Sealed this
Thirty-first Day of March, 2015

Michelle K. Lee
*Director of the United States Patent and Trademark Office*